REVERSIBLE DECIMAL COUNTER

Filed Aug. 25, 1960 2 Sheets-Sheet 1

FIG. I

INVENTORS
HAMILTON C. CHISHOLM
HENRY Y. FUJISHIGE
BY Louis J. Knobbe
ATTORNEY

REVERSIBLE DECIMAL COUNTER

Filed Aug. 25, 1960 2 Sheets-Sheet 2

INVENTORS
HAMILTON C. CHISHOLM
HENRY Y. FUJISHIGE
BY Louis J. Knobbe
ATTORNEY

United States Patent Office 3,054,001

Patented Sept. 11, 1962

3,054,001

REVERSIBLE DECIMAL COUNTER

Hamilton C. Chisholm, Orinda, and Henry Y. Fujishige, Berkeley, Calif., assignors to Beckman Instruments, Inc., a corporation of California Filed Aug. 25, 1960, Ser. No. 51,970
12 Claims. (Cl. 307—88.5)

Figure 1:
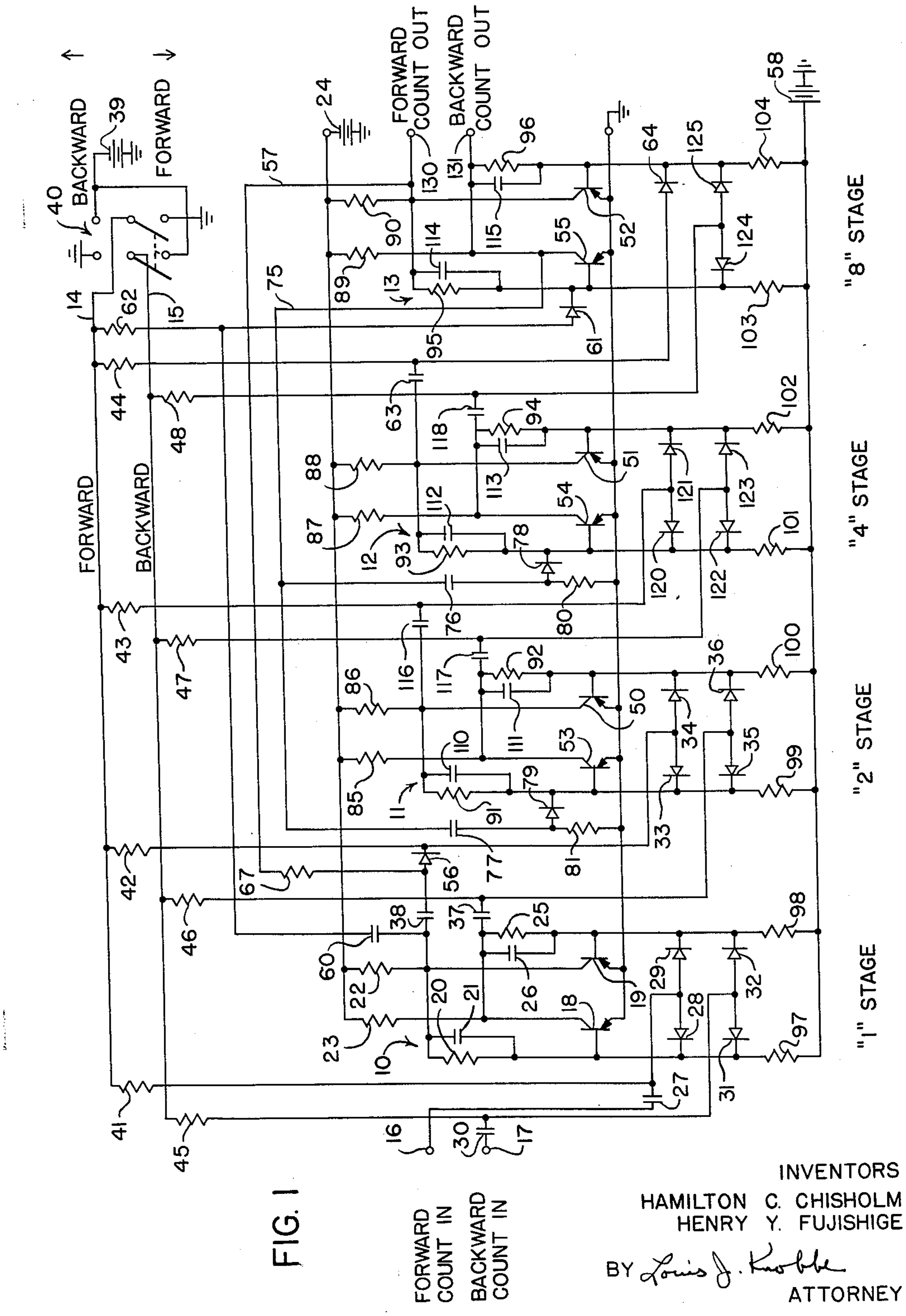

The present invention relates generally to decimal counters and, more particularly, to reversible decimal counters for counting both forward and backward directions, i.e., for both adding and subtracting.

A type of decimal counter presently known in the art employs four binary stages appropriately series connected so that their respective states indicate a number encoded in binary coded decimal form. A convenient code is one in which the binary elements are weighted according to the 8–4–2–1 system. When so weighted, the necessarily concomitant binary representations for ten to fifteen inclusive have no meaning and steps must be taken to eliminate or correct these binary representations each time they occur in a counting operation. A convenient mode of operation for eliminating these unwanted representations, and the one preferred in the present invention, requires the binary stages to assume a zero count after a nine count when adding. That is to say, for operation in the forward direction each binary stage in the counter is placed in a zero state after a count of nine, whereupon the counter may begin another counting cycle. Thus, the normal sixteen bit capacity of a four stage binary counter weighted 8–4–2–1 is attenuated to a capacity of ten bits. In subtracting, the preferred mode of operation is for the binary stages to assume a nine count following the zero count, whereupon the counter proceeds to count down from nine through zero. Again, the counter capacity has been attenuated to ten bits.

The reversible counters presently known in the art are relatively complicated and usually require a large number of expensive electrical components. Besides being more difficult and expensive to manufacture, the prior art counters generally have a limited operating speed and are not adapted for high counting rates.

Accordingly, one object of this invention is to provide an improved and simplified reversible decimal counter.

It is another object of this invention to provide a reversible decimal counter which utilizes a minimum number of electrical components.

It is still another object of this invention to provide a reversible decimal counter which is operable at very high counting rates.

Other and further objects, features and advantages of the invention will become apparent as the description proceeds.

Briefly, in accordance with a preferred form of the present invention, a reversible decimal counter comprises four transistor bistable multivibrator circuits, hereinafter referred to in equivalent fashion as "flip-flops," "binary stages" or "binaries." Each flip-flop has first and second outputs exhibiting mutually exclusive states. Adjacent ones of these flip-flops are interconnected to form a cascaded series of binary stages weighted according to the normal binary or 8–4–2–1 system. The counter will count in either a forward or backward direction depending upon whether the first or the second output of each stage, except the last, triggers an adjacent succeeding binary stage. In the present invention this mode of operation is provided by connecting the first output of each binary stage, except the last, to the input of a succeeding binary stage by first diode gate means and the second output of each flip-flop, except the last, to the input of the succeeding binary stage by second diode gate means. A first control line, denoted the "forward control" line is connected to the first gating means and a second control line denoted the "backward control" line is connected to the second gating means. By applying suitable biasing potentials to these control lines, either the first or second diode gating means is "back biased" so as to prevent the passage of carry or trigger pulses from either the first or second output to the respective succeeding binary stage.

In order to attenuate the normal sixteen bit capacity of a four binary stage counter to the required ten bits for decimal counting, additional circuits are provided in accordance with the copending application Serial No. 51,878 of Thomas H. Thomason, entitled "Reversible Decimal Counter," filed and assigned to Beckman Instruments, Inc., assignee of the present invention. The Thomason application discloses a first circuit connecting an output of the "1" stage to the input of the "8" stage and a second circuit connecting an output of the "8" stage to the input of the "2" stage. At the eighth input pulse, during forward counting or addition, the state of the "8" stage changes from its binary "0" state to its binary "1" state, at which time a biasing potential is fed back through the second circuit to prevent the next carry pulse from the "1" stage (generated at the tenth input pulse) from triggering the "2" stage. The first circuit causes the "8" stage to be returned to its "0" state at the tenth input pulse. For backward counting or substraction, a third circuit connects an output of the "8" stage to the inputs of the "2" and the "4" binary stages. With all stages in the binary "0" state, the first impulse actuates the "1" stage which, in turn, applies a carry pulse to the input of the "2" stage. In turn, the "2" stage triggers the "4" stage and the "4" stage triggers the "8" stage. The third circuit then feeds back a pulse to the "4" and the "2" stages and triggers both to their original or binary "0" state so that a decimal count of nine is registered by the counter. The succeeding input pulses serve to count consecutively from eight to zero.

Figure 2:
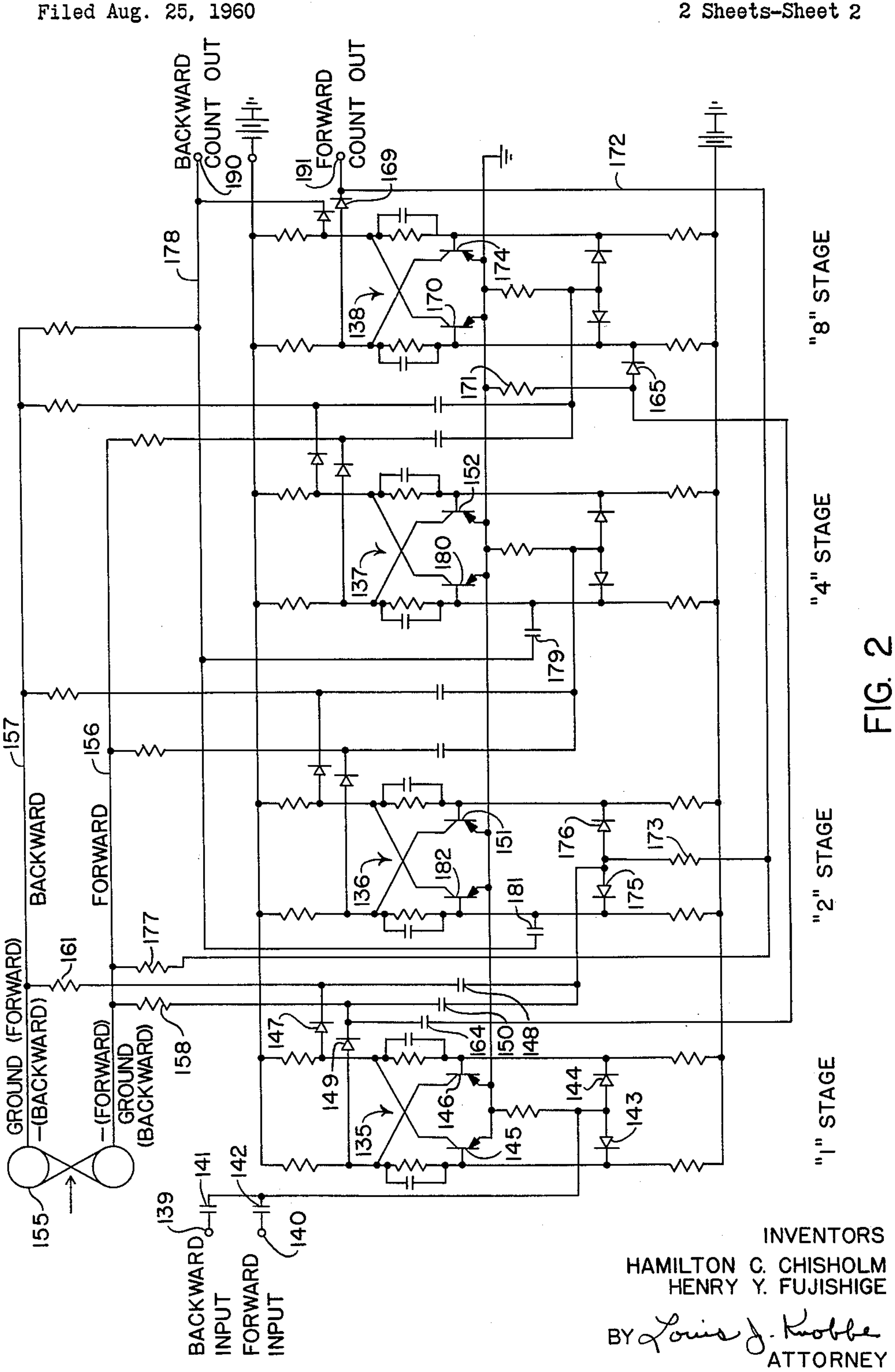

A more thorough understanding of the present invention may be obtained from the following detailed description taken in connection with the accompanying drawings in which:

FIG. 1 is a schematic diagram of the circuitry employed in a preferred embodiment of this invention; and FIG. 2 is a schematic diagram showing the circuitry of an alternative embodiment of this invention.

In FIG. 1 there is shown according to the invention a reversible decimal counter comprising four binary stages, 10, 11, 12 and 13, the interconnections of which are controlled to achieve the desired mode of counting. Either an "add" or "subtract" mode is selected by the application of suitable voltages to two control lines 14 and 15 which are respectively labeled "Forward" and "Backward." A positive pulse applied to input terminal 16 will cause the counter to count in a forward direction if the "add" mode has been previously selected. In like manner, a positive pulse applied to the input terminal 17 will cause the counter to count in a backward direction if a "subtract" mode has been previously selected. The counter shown and described uses p-n-p type transistors which require supply voltages as indicated and which work in conjunction with diodes, the polarity of which is oriented to the supply voltages. The counter can be made to function equally well with n-p-n type transistors, in which case the supply voltages and diode polarities are reversed.

Each of the binary stages comprise a pair of transistors, such as transistors 18 and 19 of binary stage 10. These transistors are connected in a well-known manner to provide a flip-flop in which each transistor is maintained in the respectively opposite state in the absence of a triggering input signal. The emitter electrodes of transistors 18 and 19 are connected together to ground. The base electrode of transistor 18 is connected to the collector electrode of transistor 19 through a cross-coupling connection comprising the parallel combination of resistor 20 and capacitor 21. In a similar manner the base electrode of transistor 19 is connected to the collector electrode of transistor 18 through a cross-coupling connection comprising parallel coupled resistor 25 and capacitor 26.

Direct current bias for binary stage 10 is supplied by a suitable source 24 having its positive terminal connected to ground and its negative terminal connected through a resistor 23 to the collector electrode of transistor 18 and through resistor 22 to the collector electrode of transistor 19. To complete the direct current biasing circuit, the base electrode of transistor 18 is returned to a positive potential source 58 through a resistor 97, and the base electrode of transistor 19 is returned to positive potential source 58 through a resistor 98.

The output signals of binary stage 10 are taken from the collector electrodes of transistors 18 and 19. Stage 10 represents a binary "0" when the right-hand transistor 19 is conducting and the left-hand transistor 18 is nonconducting. In this state, the collector electrode of transistor 19 is approximately at ground potential while the collector electrode of transistor 18 is at substantially the negative potential of source 24. A change of state of binary stage 10 causes a reversal of these potential levels; this change in potential of the collector electrodes results in a voltage step having either positive-going or a negative-going wave front.

Binary stages 11, 12 and 13 are constructed in a substantially identical manner to that of binary stage 10, each including a pair of transistors forming a bistable multivibrator. As shown in FIG. 1, binary stage 11 comprises transistors 50 and 53; resistors 85, 86, 91, 92, 99 and 100; and capacitors 110 and 111; binary stage 12 comprises transistors 51 and 54; resistors 87, 88, 93, 94, 101 and 102; and capacitors 112 and 113; and binary stage 13 comprises transistors 52 and 55; resistors 89, 90, 95, 96, 103 and 104; and capacitors 114 and 115. Adjacent ones of these stages are interconnected to form a cascaded series of binary stages weighted according to the normal binary or 8–4–2–1 system. Thus, binary stage 10 is the "1" stage, binary stage 11 is the "2" stage and binary stages 12 and 13 are the "4" and "8" stages respectively. Other circuits hereinafter described permute the normal binary code to the desired decimal code.

A representative coupling circuit between the binary stages interconnects binary stage 10 and the adjacent succeeding stage 11 and includes first and second selective pulse conducting means. The first selective pulse conducting means comprises a series-connected differentiating circuit and gating means, capacitor 38 and resistor 42 making up the former and diodes 33, 34 making up the latter. Similarly, the second selective pulse conducting means comprises capacitor 37 and resistor 46 as a differentiating circuit and diodes 35, 36 as a gating means. The first selective pulse conducting means is connected to the output of the right-hand transistor 19 by connecting capacitor 38 to the collector electrode of transistor 19 while the second selective pulse conducting means is connected to the output of the left-hand transistor 18 by connecting capacitor 37 to the collector electrode of transistor 18. Diode 56 is also series connected between capacitor 38 and diode pair 33, 34; its function will be described hereinafter.

Diodes 33 and 34 have a common anode connection and have their cathodes respectively connected to the base electrodes of transistors 53 and 50 of the "2" binary stage. Likewise, diodes 35 and 36 have a common anode connection and have their cathodes respectively connected to the base electrodes of transistors 53 and 50. As noted above, these diodes comprise selective pulse conducting means. Also, these diodes operate as "steering" diodes and permit independent triggering of each of the transistors 50 and 53 through a common connection.

The counter shown in FIG. 1 counts in a forward or backward direction depending upon which side of each stage is permitted to transmit a carry pulse to the immediately succeeding binary stage. This control is provided by "back" biasing the steering diode pair which is coupled to the unwanted binary stage output. For this purpose, double-throw double-pole switch 40 selectively grounds or connects to direct current source 39, forward control line 14 and backward control line 15. Source 39 may be a separate source as shown, or may be supplied from source 24. For forward counting, switch 40 is in its lower position and a negative voltage is applied to the backward control line 15 while forward control line 14 is connected to electrical ground. For backward counting, switch 40 is in its upper position whereby negative supply voltage is applied to the forward control line 14 and ground potential to the backward control line 15. Forward control line 14 is connected to each of the first selective pulse conducting means through respective resistors 41, 42, 43 and 44. For example, line 14 is connected to the first selective pulse conducting means which interconnects the right-hand transistor 19 of the "1" stage 10 with the input of the "2" stage 11 by connecting resistor 42 between line 14 and the junction of gating diodes 33 and 34. Backward control line 15 is connected to each of the second selective pulse conducting means through respective resistors 45, 46, 47 and 48. For example, line 15 is connected to the second selective pulse conducting means which interconnects the left-hand transistor 18 of the "1" stage 10 with the input of the "2" stage 11 by connecting resistor 46 between line 15 and the junction of gating diodes 35 and 36. Resistors 41–48 thus serve both to conduct biasing potentials to the intercoupling gating diodes and, in combination with intercoupling capacitors, differentiate interstage carry pulses. It will be apparent that the negative potential applied to the anodes of a selected steering diode pair will back bias these diodes, thereby preventing the transmission of a carry pulse to the input of its associated binary stage.

The count registered in the counter decade is determined by noting the respective states of the binary stages. A preferred indicating readout display provides ten neon bulbs connected to the binary stages according to the teachings of Hamilton C. Chisholm in Patent No. 2,843,320, entitled "Transistorized Indicating Decade Counter," and assigned to the assignee of the present invention. When so connected, the neon bulbs are lit one at a time to display the value of the digit registered by the counter decade.

The operation of the binary counter of FIG. 1 will now be described. Consider first the conditions for forward or additive counting. A source of negative potential 39 is applied to the backward control line 15 and ground potential applied to forward control line 14 by throwing the double-throw double-pole switch 40 to the lower position shown in FIG. 1. Accordingly, each of the steering diode pairs coupled to the backward control line by the respective coupling resistors are back or reverse biased, e.g., diodes 35 and 36 connected to the input of binary stage 11. These reverse biased diode pairs are capacitively connected to the collector electrodes of the left-hand transistors, e.g., transistor 18 of binary stage 10. Therefore, carry pulses from the output of each transistor stage to its adjacent stage are passed only from the collector electrode of a right-hand transistor in each stage.

For a representation of "0" count on the decimal counter of FIG. 1, right-hand transistors 19, 50, 51 and 52 are conducting current and are considered to be in the ON state. Correlatively, transistors 18, 53, 54 and 55 are in a substantially nonconducting state and are considered to be in the OFF state. Each of the binary stages 10, 11, 12 and 13 is then considered to be in its binary "0" state.

A first input pulse, positive in polarity, applied to the forward input terminal 16 will be transmitted through capacitor 27 to both of the steering diodes 28 and 29, causing the base electrode of transistor 19 to become substantially more positive than the emitter electrode potential and resulting in a cessation of current conduction through transistor 19. The potential of its collector electrode is changed to substantially that of the negative terminal of source 24 due to a cessation of current flow through resistor 22. A drive current is then transmitted through cross-coupling resistor 20 and capacitor 21 to the base electrode of transistor 18 resulting in transistor 18 being placed in its conducting condition. The respective states of the transistor are thus reversed and will so remain until another trigger pulse is received at the input of binary stage 10. No output signal will be transmitted at this first input pulse since the collector electrode of transistor 19 changes from substantially ground potential to a negative potential. This negative-going voltage step, differentiated by capacitor 38 and resistor 42, is of the reverse polarity for transmission through steering diodes 33 and 34. The second input pulse applied to binary stage 10 through forward input terminal 16 will again trigger this stage and the collector potential of transistor 19 will return to ground potential, thus generating a positive-going voltage step. This step is differentiated by capacitor 38 and resistor 42 and the resulting pulse is coupled to the input of binary stage 11 through steering diodes 33 and 34, thereupon causing binary stage 11 to trigger to its binary "1" state.

The second input pulse was seen above to trigger the second binary stage 11. In turn, the fourth input pulse will generate a carry pulse from the "2" stage 11 to the "4" stage 12 and trigger the latter stage. Likewise, the eighth input pulse will generate a carry pulse from the "4" stage 12 through the differentiating circuit comprising capacitor 63 and resistor 44 to the anode of single diode 64. The cathode of diode 64 is connected to the input base electrode of transistor 52. A pair of diodes is not required for coupling the carry pulse to the input of the last stage 13 for reasons stated hereinafter. The positive pulse applied to the base of transistor 52 when stage 13 is in the binary "0" state, causes this stage to change to its reverse stable state and thus register a binary "1" upon the eighth input pulse. Up to and including the ninth input pulse, the counter of this invention in the forward direction operates exactly as a pure binary counter. However, upon receipt of the tenth input pulse, the pure binary system must be modified to the 8–4–2–1 binary decimal system for counting in the decimal system. The necessary operation of a four stage binary decimal counter employing the 8–4–2–1 system is tabulated below for both the add and subtract modes of operation.

| Pulse Order | Add | | | | | Subtract | | | | |
|---|---|---|---|---|---|---|---|---|---|---|
| | Stage | | | | Decimal Number | Stage | | | | Decimal Number |
| | "1" | "2" | "4" | "8" | | "1" | "2" | "4" | "8" | |
| 0 | 0 | 0 | 0 | 0 | 0 | 0 | 0 | 0 | 0 | 0 |
| 1 | 1 | 0 | 0 | 0 | 1 | 1 | 0 | 0 | 1 | 9 |
| 2 | 0 | 1 | 0 | 0 | 2 | 0 | 0 | 0 | 1 | 8 |
| 3 | 1 | 1 | 0 | 0 | 3 | 1 | 1 | 1 | 0 | 7 |
| 4 | 0 | 0 | 1 | 0 | 4 | 0 | 1 | 1 | 0 | 6 |
| 5 | 1 | 0 | 1 | 0 | 5 | 1 | 0 | 1 | 0 | 5 |
| 6 | 0 | 1 | 1 | 0 | 6 | 0 | 0 | 1 | 0 | 4 |
| 7 | 1 | 1 | 1 | 0 | 7 | 1 | 1 | 0 | 0 | 3 |
| 8 | 0 | 0 | 0 | 1 | 8 | 0 | 1 | 0 | 0 | 2 |
| 9 | 1 | 0 | 0 | 1 | 9 | 1 | 0 | 0 | 0 | 1 |
| 10 | 0 | 0 | 0 | 0 | 0 | 0 | 0 | 0 | 0 | 0 |

Additional circuits for achieving a decimal operation in both the additive and subtractive operational modes are provided in accordance with the invention of Thomas H. Thomason, supra. These circuits connect the "1" stage and the "8" stage and the "8" stage and the "2" stage during addition, and the "8" stage and the "2" and "4" stages during subtraction. The particular diode circuitry comprising these circuits is part of the present invention and claimed herein.

For forward counting operation, the additional circuit provided between the output of the "1" stage and the input of the "8" stage includes a differentiating circuit (comprising capacitor 60 and resistor 62) and diode 61 series connected between the output collector electrode of transistor 19 and the input base electrode of transistor 55. This additional circuit transmits a carry pulse from the output of the "1" stage to the input of the "8" stage upon application of the tenth input pulse. The "8" stage is then triggered and returns to the required binary "0" state for registering a decimal count of ten. This additional circuit provides the necessary input for reversing the "8" stage 13 back to its binary "0" state. Therefore, no steering diode is required to be connected between the output of the "4" stage 12 and the input base electrode of transistor 55.

One additional manipulation is required in order that a zero count be represented upon application of the tenth input pulse. That is, that the "2" stage 11 must be prevented from changing state due to the carry pulse originating from the "1" stage 10 upon application of the tenth input pulse. This function is provided by the additional circuit connected between the output of the "8" stage and the input of the "2" stage comprising connecting line 57, diode 56 and resistor 67. When transistor 52 is turned OFF at the eighth input pulse, its collector electrode assumes a negative potential. This negative potential is applied through connecting line 57 and reverse biases diode 56, thereby effectively blocking any carry pulse from the "1" stage 10 to the "2" stage 11. At the tenth input pulse, a carry pulse does result and is blocked before it reaches the "2" stage. Thus, the "2" stage 11 remains in the binary "0" state. The "4" stage 12, having already been in the binary "0" state, remains therein. The tenth input pulse thus causes the decimal counter to represent the desired zero count by triggering the "1" and "8" stages which were in their binary "1" state and not triggering the "2" and "4" stages already in their binary "0" state.

For backward counting or subtraction with the circuitry of FIG. 1, switch 40 is placed in the Backward position thus connecting the forward control line 14 to the negative potential of battery 39 and connecting the backward control line 15 to electrical ground. With the stated control voltages, the steering diodes coupled to the right-hand transistor of each stage, e.g., transistor 19 of stage 10, are reverse biased and carry pulses between the stages can only be generated by the collector circuits of the left-hand transistors 18, 53, 54 and 55. With each of the transistor flip-flops returned to their binary "0" state, the "1" stage 10 is caused to trigger by application of a first positive pulse to the backward input terminal 17. The collector of transistor 18 is thereupon caused to change potential from substantially negative supply voltage to substantially ground potential thus causing a positive pulse to appear at the anodes of steering diodes 35 and 36. This carry pulse from the "1" stage 10 to the "2" state 11 triggers the second binary stage in turn causing this stage to generate a carry pulse. In turn, the "4" stage 12 triggers and generates a carry pulse which in turn triggers the "8" stage 13. As shown in the table tabulated hereinbefore, in a binary decimal counter, a count of zero in a subtracting sequence must be succeeded by a count of nine. This is accomplished by the additional circuit comprising connecting line 75 connected between the collector electrode of transistor 55 and one side of capacitors 76 and 77. The other side of capacitor 76 is connected to the base electrode of transistor 54 through diode 78 and the other side of capacitor 77 is connected to the base electrode of transistor 53 through diode 79. Diodes 78 and 79 are poled so that their anodes are connected to the respective capacitor and their cathodes are connected to the respective transistor base. A positive pulse will be transmitted therethrough to the respective transistor base. Resistors 80 and 81 are respectively connected between the anodes of diodes 78 and 79 and ground.

On the first input pulse as aforementioned, the "8" binary stage 13 is triggered from its binary "0" to its binary "1" stage. The collector electrode of transistor 55 then changes from substantially negative power supply voltage to substantially ground potential and supplies a positive step potential through line 75. This positive potential is differentiated by the respective resistor-capacitor combinations of capacitor 76, resistor 80 and capacitor 77, resistor 81 and the resulting positive pulse is gated through diodes 78 and 79 causing both the "2" and the "4" binary stages to retrigger to their binary "0" states. Only the "1" and "8" stages 10 and 13 are then left in their binary "1" state. By reference to the table above it will be apparent that the first count has achieved the desired count of nine.

The second input pulse applied to the first binary stage 10 through the backward input terminal 17 causes only the first binary stage 10 to trigger since a positive carry pulse is not generated when the transistor 18 is changed from its ON to its OFF state. The third input pulse triggers the first binary stage 10 which generates a carry pulse. This pulse triggers the second binary stage or "2" stage 11 which in turn generates a carry pulse. The third binary stage or "4" stage 12 is triggered thereby and it in turn generates a carry pulse which is applied to the fourth binary stage or "8" stage 13. The "8" binary stage is thus triggered to its initial binary "0" state and remains in that state for the duration of the decade count. With this change of state of binary stage 13, a positive pulse is not transmitted over line 75 since the collector electrode of transistor 55 changes from a substantially ground potential to substantially negative power supply potential. Thus, the first, second and third binary stages 10, 11 and 12 are left in their binary "1" states for the desired count of seven as denoted by the table of FIG. 2. The succeeding seven input pulses trigger the first three binaries in turn, reducing the stored count each time by one count until a zero count is reached at the tenth input pulse.

The additional circuits enabling a decimal counter do not interfere with each other when adding or subtracting. In the forward counting mode, connecting line 75, capacitors 76 and 77 and diodes 78 and 79 (used in the backward counting mode) continue to feed back a positive pulse to the "2" and the "4" stages when the "8" stage changes from a binary "0" to a binary "1" state (at the eighth input pulse when adding). This positive pulse is applied to the base electrodes of nonconducting transistor 53 of the "2" stage 11 and nonconducting transistor 54 of the "4" stage 12 and tends to more strongly reverse bias their emitter to base junctions. Transistors 53 and 54 thus remain OFF and stages 11 and 12 are unchanged. In the backward counting mode, diode 61 (used in the forward counting mode) is reverse biased by the negative potential of control line 14 connected thereto through resistor 62. Thus, no carry pulses are transmitted through this diode during subtraction. Connecting line 57 and diode 56 (also used in the forward counting mode) are connected to the output of the right-hand transistor 19 of stage 10. Since carry pulses from this side of binary stage 10 are not used during subtraction, any blocking thereof has no effect on the reverse counter operation. Resistance 67 and conductor 57 connected between the collector electrode of transistor 52 and the anode of diode 56 (also used in the forward counting mode) do not transmit an erroneous carry pulse from the "1" stage 10 to the forward output terminal 130 in either the forward or backward counting modes. For eight counts out of ten during both forward and backward operation, the output transistor 52 is ON and effectively grounds the output terminal. In forward operation the tenth input would generate a positive voltage step from transistor 19. This step, however, triggers binary 13 through capacitor 60, and the output 130 is driven positive essentially in synchronism with the triggering of binary 10. In reverse operation, the "8" stage is triggered on the first input along with the "1" stage. The second input generates a positive step from transistor 19 which is coupled to the output 130 through capacitor 38 and resistor 67. However, the forward control is now negative and the differentiated step is attenuated through diode 56 and resistor 42. In addition, resistors 67 and 90 act as a voltage divider and greatly reduce the voltage appearing at the output.

Although in the operation described above, it has been assumed for ease of explanation, that the counting stages were initially in the binary "0" states prior to both forward and backward counting, it will be understood that a reversal of counting from either adding to subtracting or subtracting to adding may be made with any predetermined count being represented by the counter.

It will be understood that several of the four stage binary decimal counters such as are shown in FIG. 1 may be cascaded so as to count to the required number of decimal digits. Thus, the output of the "8" binary stage 13 would be connected to the input of the "1" binary stage of a succeeding counter by connecting the forward and backward output terminals 130 and 131 to respective forward and backward input terminals of a succeeding counter.

By way of illustration only, the following specific values are given as typical of those which may be used in the embodiment of the invention illustrated in FIG. 1.

| | |
|---|---|
| Transistors 18, 19, 50, 51, 52, 53, 54, 55 | 2N414. |
| Resistors 20, 25, 67, 80, 81, 91, 92, 93, 94, 95, 96 | 15K ohms. |
| Capacitors 21, 26, 110, 111, 112, 113, 114, 115 | 220 micromicrofarads. |
| Resistors 22, 23, 85, 86, 87, 88, 89, 90 | 3.3K ohms. |
| Battery 24 | 15 volts. |
| Capacitors 27, 30, 37, 38, 60, 63, 76, 77, 116, 117, 118 | 150 micromicrofarads. |
| Diodes 28, 29, 31, 32, 33, 34, 35, 36, 56, 61, 64, 78, 79, 120, 121, 122, 123, 124, 125 | IN 198. |
| Battery 39 | 15 volts. |
| Resistors 41, 42, 43, 44, 45, 46, 47, 48, 62 | 6.8K ohms. |
| Resistors 97, 98, 99, 100, 101, 102, 103, 104 | 33K ohms. |
| Battery 58 | 10 volts. |

Another embodiment of this invention is illustrated in FIG. 2. A decimal counter shown in this figure comprises four binary stages 135, 136, 137 and 138 which are substantially identical to the previously described binary stages 10, 11, 12 and 13. The counter of FIG. 2 differs, however, in the circuitry intercoupling adjacent binary stages for achieving a series of binary stages.

Thus, the collector electrode of transistor 145 of binary stage 135 is connected to the input of the succeeding binary stage 136 by a series path comprising a diode 147 and capacitor 148. Similarly, the collector electrode of transistor 146 of binary stage 135 is connected to the input of binary stage 136 by a series connected diode 149 and capacitor 150. In like manner, the output of the "2" counting stage 136 is connected to the input of the "4" counting stage 137 and the output of the "4" counting stage is connected to the input of the "8" counting stage 138. Biasing potentials are applied to each of the respective coupling diodes for providing preselected additive or subtractive counting. The biasing potentials may be applied by a reversible switch such as shown in the embodiment of FIG. 1 or as an alternative means, a flip-flop 155 may be connected for applying mutually opposite potentials to a forward control line 156 and a backward control line 157. As labeled in the diagram, the flip-flop 155 may provide either a ground or a negative potential at its output terminals.

The operation of the circuit of FIG. 2 will now be described. Consider first the conditions for forward counting. A negative potential approximately equal to the negative supply voltage is applied to the forward control line 156 by the flip-flop 155. The backward control line 157 is then connected to electrical ground. At zero count, the right-hand transistors 146, 151, 152 and 174 are conducting current and are considered in the ON state. The potentials of their collector electrodes are at substantially ground or zero volts. The left-hand transistors 145, 182, 180 and 170 are in a nonconducting condition and are considered in the OFF state. The potentials of their collectors are approximately equal to the negative supply voltage.

Circuit examination will show that there are two coupling circuits between adjacent binary stages. Each circuit comprises a diode, a resistor and a capacitor originating at the collector electrodes of each transistor and connected to a common pair of steering diodes. The potentials applied to the forward and backward control lines determine which circuit is reverse biased. A representative first coupling circuit includes a diode 147 having its anode connected to the collector electrode of transistor 145 and its cathode connected to the backward control line 157 through resistor 161. This line is grounded during the forward counting mode; therefore, diode 147 is reverse biased during all forward counting so that carry pulses are prevented from being conducted from the left-hand transistor 145. A representative second coupling circuit includes a diode 149 having its anode connected to the collector electrode of transistor 146 and its cathode connected to the forward control line 156 through resistor 158. This line is connected to a negative potential during forward counting so that the passage of carry pulses is not impeded between the collector electrode of each right-hand transistor and the following adjacent stage. The resulting function of the circuit of FIG. 2 is therefore similar to that of the counter illustrated in FIG. 1; for forward counting carry pulses are developed only when a right-hand transistor regenerates to the ON state while for backward counting carry pulses are developed only when a left-hand transistor regenerates to the ON state.

At the count of zero, the collector potential of transistor 146 is zero volts. When the first input pulse is applied to forward input terminal 140, the collector potential of transistor 146 changes to a negative value. This negative voltage step will not be transmitted by the steering diodes 175 and 176. The second input pulse will cause the binary circuit 135 to trigger and the collector potential of transistor 146 will return to ground potential. The coupling diode 149 then conducts and develops a potential across resistor 158, which is terminated on the forward control line 156. The developed potential has a positive wave front which will be coupled through capacitor 150 and steering diodes 175 and 176 to the input base electrodes of the second binary 136 and cause it to trigger. The third through ninth input pulses serve to consecutively register the appropriate count, in the same manner as the counter of FIG. 1.

The additional circuits provided for permuting the counter to a decimal scale are similar to that of the circuit of FIG. 1. Thus, a first circuit connected between the output of the "1" stage 135 and the input of the "8" stage 138 comprises series connected capacitor 164 and diode 165 connected between the cathode of diode 149 and the base electrode of the left-hand transistor 170. During forward counting, a carry pulse will be transmitted through this circuitry on the tenth input pulse and cause the "8" binary stage 138 to revert to its binary "0" state.

In order to prevent the "2" stage 136 from triggering at the tenth input pulse during forward counting, a second circuit is provided to block the carry pulse transmitted from the "1" stage 135. The input circuit of the "2" stage is terminated at the ground potential of the collector electrode of transistor 174 by resistor 173, conducting line 172 and diode 169 when transistor 174 is ON. Diodes 175 and 176 are thus capable of conducting positive voltages. When, at the eighth input pulse transistor 174 is cut off, diode 169 is reverse biased and resistor 173 terminates through resistor 177 to the forward control line held at the negative supply voltage. This voltage applied to the steering diodes 175 and 176 in the input circuit of the "2" counter effectively back biases each of them and prevents a carry pulse at the tenth input pulse from triggering this binary stage. All four binary stages are then in their "0" state after the tenth input pulse has been applied.

For backward or subtractive counting the forward control line 156 is connected to ground potential and the backward control line 157 is connected to a negative supply voltage by triggering the flip-flop 155. With the stated control voltages, carry pulses between binary stages can only be generated by collector circuits of the left-hand transistors of which transistor 145 is representative. With the first input pulse, the first binary or the "1" stage triggers and immediately generates a carry pulse. This carry pulse triggers the "2" stage which triggers and also generates a carry pulse. In turn, the "4" stage triggers and generates a carry pulse. When the "8" stage triggers in turn, it generates a feedback pulse. This pulse is fed back over conducting line 178 through capacitor 179 to the base electrode of transistor 180 of the "4" stage. This feedback pulse causes the "4" stage to trigger to its binary "0" state. In similar manner, the feedback pulse is also fed through capacitor 181 to the base electrode of transistor 182 of the "2" stage causing this stage to be reset to its binary "0" state. The result is a condition wherein the "1" binary and the "8" binary are triggered to the binary "1" condition which is the condition for a decimal count of nine. The second input pulse triggers only the first binary 135 and the resultant electrical state is the condition for a decimal eight count. The third input triggers the first binary 135 which generates a carry pulse. This pulse triggers the "2" stage which in turn generates another carry pulse. The "4" stage is triggered thereby and it in turn generates a carry pulse which is applied to the "8" stage. The "8" stage is triggered to its binary "0" condition and remains in that state for the duration of the decade count. The result then is that the "1," "2" and "4" stages are triggered to the binary "1" electrical state which is a condition for a seven count. The succeeding seven input pulses trigger the first three binaries 135, 136, 137 in turn reducing the stored count each time by one count until a zero count is reached at the tenth input pulse.

The embodiment of FIG. 2 may be coupled to as many like circuits as are required to record the desired number of decimal digits. Thus, the backward input terminal 139 would be connected to the backward output terminal of a prior counter and the forward input terminal 140 would be connected to the forward output terminal of the prior circuit. Likewise, the backward output terminal 190 would be connected to the backward input terminal of a succeeding counting circuit and the forward output terminal 191 would be connected to the input of a succeeding forward input terminal.

The additional circuits which permute the four stages of FIG. 2 to the decimal system do not interfere with each other when adding or subtracting. In the forward counting mode, connecting line 178 and capacitors 179 and 181 (used in the backward counting mode) do continue to feed back a positive pulse to the "2" and the "4" stages when the "8" stage changes from a binary "0" to a binary "1" state (at the eighth input pulse when adding). This positive pulse is applied to the base electrodes of non-conducting transistor 182 of the "2" stage 136 and nonconducting transistor 180 of the "4" stage 137 and tends to more strongly reverse bias their emitter to base junctions. Transistors 180 and 182 thus remain in their OFF state and stages 136 and 137 are unchanged. Capacitors 181 and 179 respectively connected between the "2" and "4" stages 136 and 137 and the backward output terminal 190 (also used in the backward counting mode) do not transmit an erroneous forward carry pulse from these stages to the output terminal 190. In both the "2" and "4" stages, the positive drive pulse generated in these stages during a reversal of state thereof is dissipated almost completely in the base circuits of respective transistors 182 and 180. Any remaining pulse voltage is capacitively coupled to the output with additional coupling loss. This remainder pulse also has as a load, a back-biased diode at the collector electrode of transistor 170 and the input of a following counter which is capacitor coupled. As a result, the pulse energy is of minor significance. Negative pulses are, of course, blocked by the paired steering diodes in a succeeding counter decade. In the backward counting mode, diode 165 (used in the forward counting mode) does not receive any carry pulses since coupling diode 149 is reverse biased by the ground potential applied to its cathode by forward control line 156. Connecting line 172 (used in the forward conducting mode to ground the anodes of diodes 175 and 176 during the count of zero through eight) and resistor 177 (used in the forward conducting mode to connect diodes 175 and 176 to a reverse bias potential for the tenth input pulse) do not so operate in the backward counting mode since the forward control line 156, to which resistor 177 is connected, is then grounded. Diodes 175 and 176 are therefore never reverse biased during the backward counting mode and thus do not incorrectly interfere with the circuit operation during this counting mode.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. A reversible decimal counter comprising four binary stages, each having first and second output means maintained in respectively opposite states and an input means for reversing the state thereof; a forward control line; a backward control line; means for selectively energizing said forward and backward control lines at respectively different voltage levels; first means for coupling the first output means of the first and second stages respectively to the input means of the second and third stages; second means for coupling the second output means of the first, second and third stages to the input means of the second, third and fourth stages; third means for coupling the first output of the third stage to the input means of the fourth stage; each of said first means comprising a pair of first diodes with one of their common electrodes interconnected and their other electrodes connected to the input means of the succeeding stage, means connecting a capacitor between the interconnection of the common first diode electrodes and the first output of the preceding stage, and a resistor connected between said interconnection and said forward control line; each of said second means comprising a pair of second diodes with one of their common electrodes interconnected and their other electrodes connected to the input means of the succeeding stage, means connecting a capacitor connected between the interconnection of the common second diode electrodes and the second output of the preceding stage, and a resistor connected between said interconnection and said backward control line; said third means comprising a diode having one of its electrodes connected to the input means of said fourth stage, a capacitor connected between the other electrode of said diode and the first output of said third stage, and a resistor connected between said other electrode of said diode and said forward control line, and means for changing the normal binary operation of said four stage counter to operate in the decimal system.

2. A reversible counter comprising four binary stages, each having first and second output means maintained in respectively opposite states and an input means for reversing the state thereof; a forward control line; a backward control line; means for selectively energizing said forward and backward control lines at respectively different voltage levels; first diode gating means coupling respective first output means and input means of adjacent stages, first resistive means coupling said first diode gating means to said forward control line, second diode gating means coupling respective second output means and input means of adjacent stages, and second resistive means coupling said second diode gating means to said backward control line, at least one of said first and second diode gating means including a pair of diodes with one of their common electrodes interconnected, means connecting said common electrode connection to the output means of the preceding adjacent stage, and means connecting the other electrodes to the input means of the succeeding adjacent stage.

3. A reversible counter comprising four binary stages, each having first and second output means maintained in respectively opposite states and an input means for reversing the state thereof; a forward control line; a backward control line; means for selectively energizing said forward and backward control lines at respectively different voltage levels; first diode gating means coupling respective first output means and input means of adjacent stages, first resistive means coupling said first diode gating means to said forward control line, second diode gating means coupling respective second output means and input means of adjacent stages, and second resistive means coupling said second diode gating means to said backward control line, at least one of said first and one of said second diode gating means including a first diode having one of its electrodes connected to the first output means of the preceding adjacent stage, a second diode having one of its electrodes connected to the second output means of the preceding adjacent stage, one of said first resistive means connecting the other electrode of said first diode to said forward control line and one of said second resistive means connecting the other electrode of said second diode to said backward control line, and means connecting said other electrodes of said first and second diodes to the input means of the succeeding adjacent stage.

4. The reversible counter defined in claim 3 wherein said last named means includes a pair of diodes with one of their common electrodes interconnected, means connecting said common electrode connection to said other electrodes of said first and second diodes, and means connecting the other electrodes of said pair of diodes to the input means of the succeeding adjacent stage.

5. The reversible counter defined in claim 4 wherein said means connecting said common electrode connection to said other electrodes of said first and second diodes comprises a first capacitor connected between the other electrode of said first diode and said common electrode connection and a second capacitor connected between the other electrode of said second diode and said common electrode connection.

6. A reversible decimal counter comprising four binary stages, each of said stages including first and second transistors connected in a bistable circuit with a common connection between their emitter electrodes and the base electrode of each transistor cross-coupled with the collector electrode of the other transistor; means connecting said stages to form a cascaded series weighted according to the normal binary system comprising first diode gating means connecting the collector electrodes of said first transistors to the base electrodes of the first and second transistors of respective adjacent succeeding stages and second diode gating means connecting the collector electrodes of said second transistors to the base electrodes of said first and second transistors of respective adjacent succeeding stages, means for selectively reverse biasing said first and second diode gating means to prevent the passage of carry pulses therethrough, and means for permuting said normal binary system to the decimal system, at least one of said first diode gating means comprising a pair of diodes with one of their common electrodes interconnected, means connecting said common electrode connection to the collector electrode of the first transistor in the preceding adjacent stage, and the other electrode connected to respective base electrodes of the first and second transistors in the succeeding adjacent stage; and at least one of said second diode gating means comprising a pair of diodes with one of their common electrodes interconnected, means connecting said common electrode connection to the collector electrode of the second transistor in the preceding adjacent stage, and the other diode electrodes connected to respective base electrodes of the first and second transistors in the succeeding adjacent stage.

7. A reversible decimal counter comprising four binary stages, each of said stages including first and second transistors connected in a bistable circuit with a common connection between their emitter electrodes and the base electrode of each transistor cross-coupled with the collector electrode of the other transistor; means connecting said stages to form a cascaded series weighted according to the normal binary system comprising first diode gating means connecting the collector electrodes of said first transistors to the base electrodes of the first and second transistors of respective adjacent succeeding stages and second diode gating means connecting the collector electrodes of said second transistors to the base electrodes of said first and second transistors of respective adjacent succeeding stages, means for selectively reverse biasing said first and second diode gating means to prevent the passage of carry pulses therethrough, and means for permuting said normal binary system to the decimal system, each of said first diode gating means comprising a first diode having one of its electrodes connected to the collector electrode of the first transistor in the preceding adjacent stage, each of said second diode gating means comprising a second diode having one of its electrodes connected to the collector electrode of the second transistor in the preceding adjacent stage, and means connecting the other electrodes of said first and second diodes to the base electrodes of the first and second transistors in the succeeding adjacent stage.

8. A reversible decimal counter comprising four stages, each stage including first and second elements having mutually exclusive ON and OFF states; means connecting said stages in a cascaded series weighted according to the normal binary system including first selective pulse conducting means connected between the output of the first element of each stage, except the final stage of the series, and the inputs of the first and second elements of the following stage, and second selective pulse conducting means connected between the output of the second element of each stage, except the final stage of the series, and the inputs of the first and second elements of the following stage; and means for permuting said normal binary system to the decimal system comprising first current conductive means connecting the output of the first element of said first stage to the input of the fourth stage including a series connected differentiating circuit and first diode; the first selective pulse conducting means connecting said first and second stages including a second diode; second current conductive means connecting the output of the first element of said fourth stage in biasing relationship with said second diode; and third current conductive means connecting the output of the second element of said fourth stage and the inputs of the second elements of the second and third stages including third and fourth diodes.

9. A reversible decimal counter comprising four stages, each stage including first and second elements having mutually exclusive ON and OFF states and each stage representing a binary "0" when said first element is ON and a binary "1" when said first element is OFF; means connecting said stages in a cascaded series weighted according to the normal binary system including first selective pulse conducting means connected between the output of the first element of each stage, except the final stage of the series, and the inputs of the first and second elements of the following stage, and second selective pulse conducting means connected between the output of the second element of each stage, except the final stage of the series, and the inputs of the first and second elements of the following stage; and means for permuting said normal binary system to the decimal system comprising first current conductive means connecting the output of the first element of said first stage to the input of the second element of the fourth stage including first diode gating means; the first selective pulse conducting means connecting said first and second stages including second diode gating means; second current conductive means connecting the output of the first element of said fourth stage in biasing relationship wtih said second diode gating means; and third current conductive means connecting the output of the second element of said fourth stage and the inputs of the second elements of the second and third stages including respective capacitors.

10. The reversible decimal counter defined in claim 9 wherein a biasing means is connected in biasing relationship with said first diode gating means so that said first diode gating means is reverse biased during backward counting.

11. The reversible decimal counter defined in claim 9 wherein the first selective pulse conducting means connecting said first and second stages comprises a first diode having one of its electrodes coupled to the output of the first element of the first stage, second and third diodes having one of their common electrodes connected together, the other electrodes of said second and third diodes being respectively connected to the inputs of the first and second elements of the second stage, said second current conductive means comprising a resistor connected between said one electrode of said first diode and the output of the first element of said fourth stage so that said first diode is reverse biased when said fourth stage is in the binary "1" state.

12. The reversible decimal counter defined in claim 9 wherein the first selective pulse conducting means connecting said first and second stages comprises a capacitor, a first diode having one of its electrodes coupled to the output of the first element of the first stage and its other electrode connected to one side of said capacitor, second and third diodes having one of their common electrodes connected together to the other side of said capacitor and through a resistor to a source of reverse bias; the other electrodes of said second and third diodes being respectively connected to the inputs of the first and second elements of the second stage; said second current conductive means comprising a connection between said one electrode of the second and third diodes and the output of the first element of said fourth stage so that said second and third diodes are prevented from being reverse biased when said fourth stage is in the binary "0" state.

References Cited in the file of this patent

UNITED STATES PATENTS

| | | |
|---|---|---|
| 2,841,705 | Moerman | July 1, 1958 |
| 2,935,255 | Reiner | May 3, 1960 |
| 2,977,539 | Townsent | Mar. 28, 1961 |

OTHER REFERENCES

Pulse and Digital Circuits, by Millman and Taub, McGraw-Hill Book Co., 1956, chapter 14, pages 429 to 440.